US009313194B2

(12) United States Patent
Cai et al.

(10) Patent No.: US 9,313,194 B2
(45) Date of Patent: *Apr. 12, 2016

(54) VERIFICATION OF CONFIGURATION USING AN ENCODED VISUAL REPRESENTATION

(71) Applicant: International Business Machines Corporation, Armonk, NY (US)

(72) Inventors: Lin Cai, Shanghai (CN); Bin Cao, Rochester, MN (US); James E. Carey, Rochester, MN (US); Bradley L. Manning, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 22 days.

This patent is subject to a terminal disclaimer.

(21) Appl. No.: 14/520,946

(22) Filed: Oct. 22, 2014

(65) Prior Publication Data

US 2016/0065431 A1  Mar. 3, 2016

Related U.S. Application Data

(63) Continuation of application No. 14/471,264, filed on Aug. 28, 2014.

(51) Int. Cl.
*H04L 29/06* (2006.01)
*H04L 12/26* (2006.01)
(Continued)

(52) U.S. Cl.
CPC .............. *H04L 63/08* (2013.01); *H04L 43/045* (2013.01); *H04L 43/08* (2013.01); *H04L 63/102* (2013.01); *H04L 67/10* (2013.01); *H04W 12/08* (2013.01)

(58) Field of Classification Search
CPC ........ H04L 63/08; H04L 67/10; H04L 43/045
See application file for complete search history.

(56) References Cited

U.S. PATENT DOCUMENTS

| 8,468,054 | B1* | 6/2013 | Espinoza | G06Q 10/00 235/381 |
| 2005/0092839 | A1* | 5/2005 | Oram | G07B 11/02 235/462.13 |
| 2010/0088187 | A1* | 4/2010 | Courtney | G06Q 30/02 705/14.73 |

(Continued)

FOREIGN PATENT DOCUMENTS

WO    2013046231 A1    4/2013

OTHER PUBLICATIONS

Mell et al., "The NIST Definition of Cloud Computing", National Institute of Standards and Technology, NIST Special Publication 800-145, Sep. 2011, Gaithersburg, MD.

(Continued)

*Primary Examiner* — Harunur Rashid
*Assistant Examiner* — Shahriar Zarrineh
(74) *Attorney, Agent, or Firm* — Scott A. Berger

(57) ABSTRACT

Aspects of the present disclosure relate to a method, system, and computer program product for verifying a parameter on a computing node. The method can include accessing a first dynamically generated encoded visual representation from a computing node. The method can also include identifying one or more parameters of the computing node from the first dynamically generated encoded visual representation. The method can also include determining whether the computing node has a first parameter from the one or more parameters. The method can also include displaying the first parameter in response to the computing node having the first parameter.

9 Claims, 9 Drawing Sheets

(51) Int. Cl.
*H04W 12/08* (2009.01)
*H04L 29/08* (2006.01)

(56) References Cited

U.S. PATENT DOCUMENTS

| | | | |
|---|---|---|---|
| 2011/0071895 A1 | 3/2011 | Masri | |
| 2011/0218730 A1* | 9/2011 | Rider | G01C 21/00 701/533 |
| 2013/0032634 A1* | 2/2013 | McKirdy | G06Q 30/0271 235/375 |
| 2013/0048739 A1* | 2/2013 | West | G06K 19/06112 235/494 |
| 2013/0139233 A1* | 5/2013 | Maity | H04L 63/08 726/7 |
| 2013/0301870 A1* | 11/2013 | Mow | G06T 1/0021 382/100 |
| 2014/0034721 A1 | 2/2014 | Gadepalli et al. | |
| 2014/0054367 A1* | 2/2014 | Alexeev | G06Q 20/32 235/375 |
| 2014/0096215 A1 | 4/2014 | Hessler | |
| 2014/0319206 A1* | 10/2014 | Chakra | G06Q 30/00 235/375 |
| 2015/0019359 A1* | 1/2015 | Swierczek | G06Q 20/1235 705/26.1 |
| 2015/0248663 A1* | 9/2015 | Meere | G06Q 20/3274 705/17 |

OTHER PUBLICATIONS

Cai et al., "Verification of Configuration Using an Encoded Visual Representation", U.S. Appl. No. 14/471,264, filed Aug. 28, 2014.
Cai et al., "Communication of Configuration Using an Encoded Visual Representation", U.S. Appl. No. 14/471,271, filed Aug. 28, 2014.
List of IBM Patents or Patent Applications Treated as Related.

* cited by examiner

VERIFICATION OF CONFIGURATION USING AN ENCODED VISUAL REPRESENTATION

BACKGROUND

The present disclosure relates to compute node communication, and more specifically, to compute node communication of configuration settings.

In a distributed computing infrastructure, various compute nodes can be within the same physical location, e.g., a data center. The compute nodes can support one or more virtual machines. To convey information regarding the virtual machines supported by the compute nodes, the host may require a user, e.g., a service technician, to have various logins and access permissions to view the information.

SUMMARY

According to embodiments of the present disclosure, a method, a system, and a computer program product for verifying a parameter on a computing node are provided.

One embodiment is directed toward a method. The method can include accessing a first dynamically generated encoded visual representation from a computing node. The method can also include identifying one or more parameters of the computing node from the first dynamically generated encoded visual representation. The method can also include determining whether the computing node has a first parameter from the one or more parameters. The method can also include displaying the first parameter in response to the computing node having the first parameter.

Another embodiment is directed toward a system. The system can include a computing node. The system can also include a mobile device, having an encoded visual representation reader. The mobile device can be configured to access a first dynamically generated encoded visual representation from the computing node. The mobile device can be configured to identify one or more parameters of the computing node from the first dynamically generated encoded visual representation. The mobile device can be configured to determine whether the computing node has a first parameter from the one or more parameters. The mobile device can be configured to display the first parameter in response to the computing node having the first parameter.

Another embodiment is directed toward a computer program product for verifying a parameter on a computing node comprising a computer readable storage device having a computer readable program stored therein, wherein the computer readable program, when executed on a computing device, causes the computing device to access a first dynamically generated encoded visual representation from a computing node. The computer readable program can also cause the computing device to identify one or more parameters of the computing node from the first dynamically generated encoded visual representation. The computer readable program can also cause the computing device to determine whether the computing node has a first parameter from the one or more parameters. The computer readable program can also cause the computing device to display the first parameter in response to the computing node having the first parameter.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
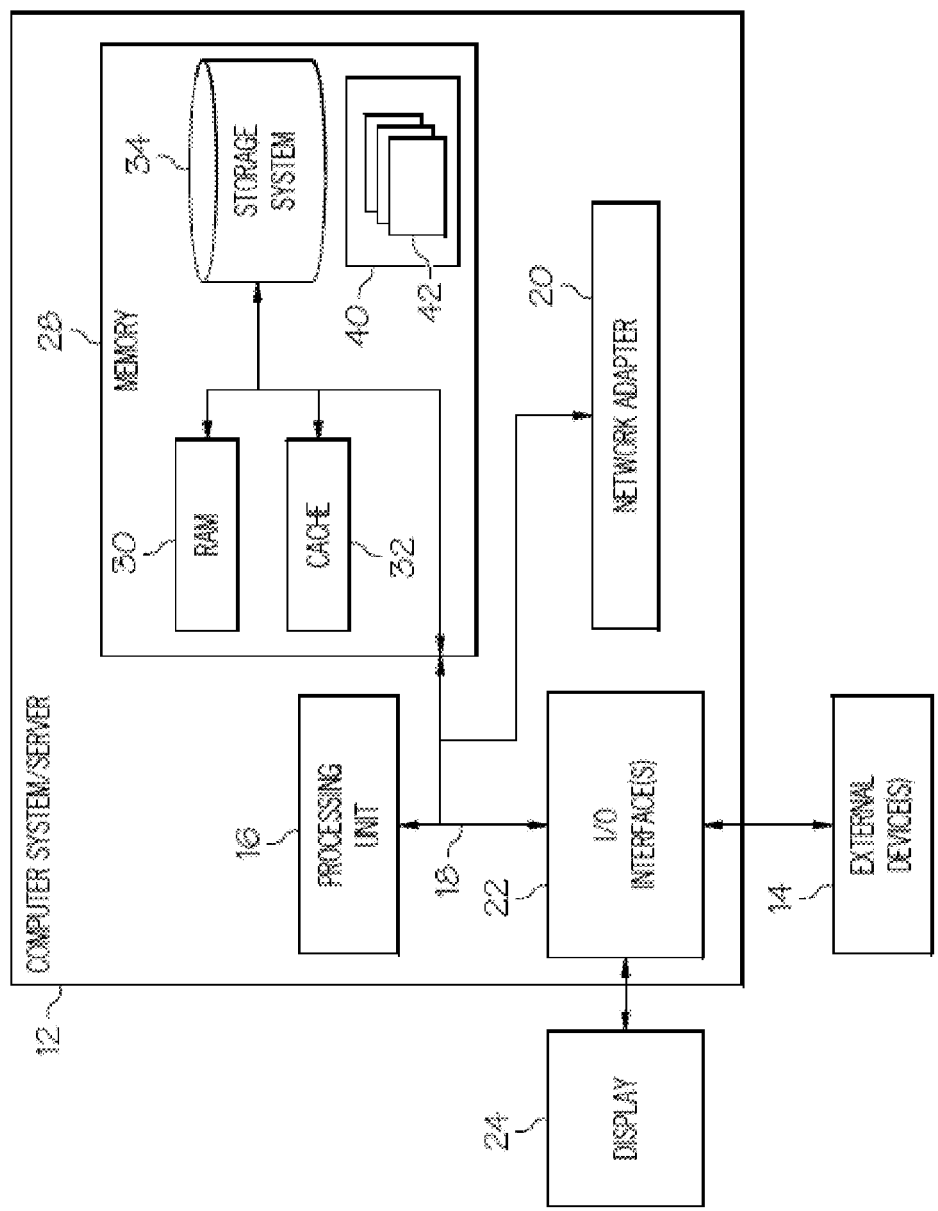
FIG. 1 illustrates an operating environment, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to host communication, and more particularly, to compute node communication of configuration settings. For instance, a compute node can communicate the configuration of the compute node to a user, e.g., a service technician. The compute node can communicate the configuration via an encoded visual representation (e.g., a barcode). The encoded visual representation may be coded or encrypted so that a third party can decipher the settings without the corresponding table or security key. The user can read the encoded visual representation with a configured device which translates the encoded visual representation/barcode into the configuration settings of the compute node. Various aspects of the disclosure can relate to the barcode generation of the compute node. While the present disclosure is not necessarily limited to such applications, various aspects of the disclosure may be appreciated through a discussion of various examples using this context.

A distributed cloud environment may be complex and prone to user errors. For example, a simple task of running an inventory of compute nodes that are providing cloud services can be difficult on an administrator level. The goals of examining a compute node or physical machine in the distributed cloud environment can include knowing how that physical machine, once located within a data center, is setup to participate in the distributed cloud environment. For example, when a physical machine needs to be taken out of service for a hardware upgrade, determining cloud components (e.g., virtual machines) may be difficult to coordinate with the cloud manager in order to quiesce the physical machine with minimal impact to the distributed cloud environment. Aspects of the present disclosure related to a secure implementation of identifying the cloud component on the physical machine dynamically (such as via a generated bar code) and to confirm that it is the physical machine hosting the cloud component. Furthermore, within a Virtual Machine (VM), users have their own preferences of how a Graphical User Interface (GUI) should look and feel (Operating System, applications, etc.). Configuring a GUI to a desired look and feel may be complicated because every OS has its own settings or tools to do the work. Dynamically constructing specific end user preferences (Application GUI preferences) may be difficult. For example, a user can't make an application button have the look and feel of a button found on a web site. The current methods of configuring a GUI requires manual steps, configure files or patches to the system. None of them is flexible and easy for a user to use. If a VM image's configuration can be rendered as a barcode, then a mobile device can read it and use it to apply the desired configuration to another VM.

Aspects of the present disclosure concern using mobile-device readable information, e.g., bar-codes, as a means of providing a means for conveying information from the physical machine. The information can be about the physical machine or about the VMs running on that machine. Various aspects can relate to a cloud component being able to generate a scannable representation of the role within the distributed computing environment. The scannable representation could be a bar code or a two dimensional bar code containing the key information (e.g., one-to-many mapping). The scannable representation could also be characters that can be read using OCR. The scannable representation may also contain information regarding cloud resources, e.g., hosts, memory, or storage. The scannable representation can also capture the end user preferences (look and feel) of specific OS, applications, or settings within a distributed computing environment.

Aspects of the present disclosure can also utilize a mobile device's camera as a scanner to take in the scannable representation(s) from the compute node via terminal. The terminal may be intended for physical access to compute node. Aspects of the present disclosure can also result in security and network enhancement. For example, comprehensive system information from compute node can be delivered to the mobile device.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
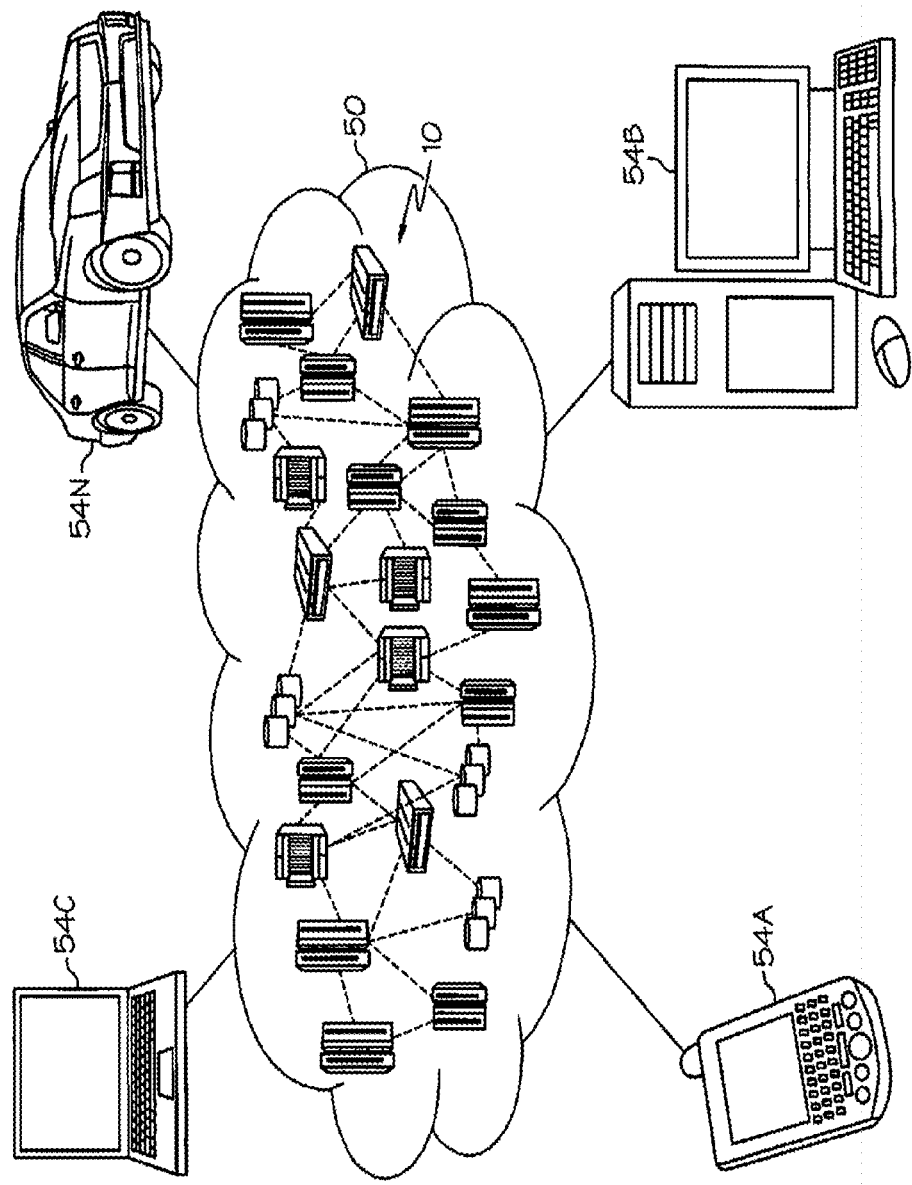
FIG. 2 illustrates a cloud computing environment, according to various embodiments.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 3:
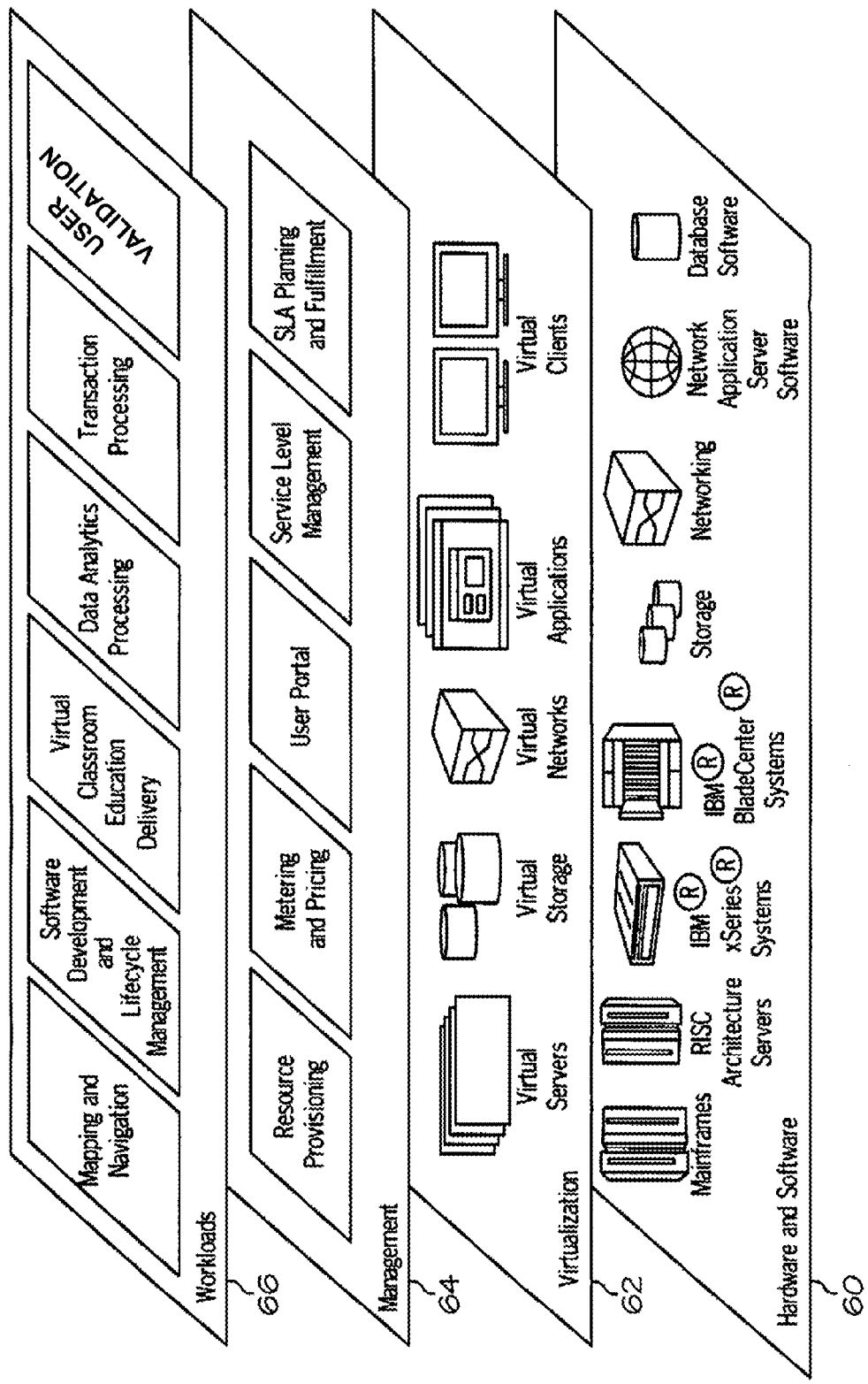
FIG. 3 illustrates a set of functional abstraction layers provided by the cloud

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and user validation to virtual machines.

In various embodiments, the term distributed computing environment refers to the cloud computing environment 50 in FIG. 2. The term compute node may refer to the cloud computing node 10 in FIG. 1.

Figure 4:
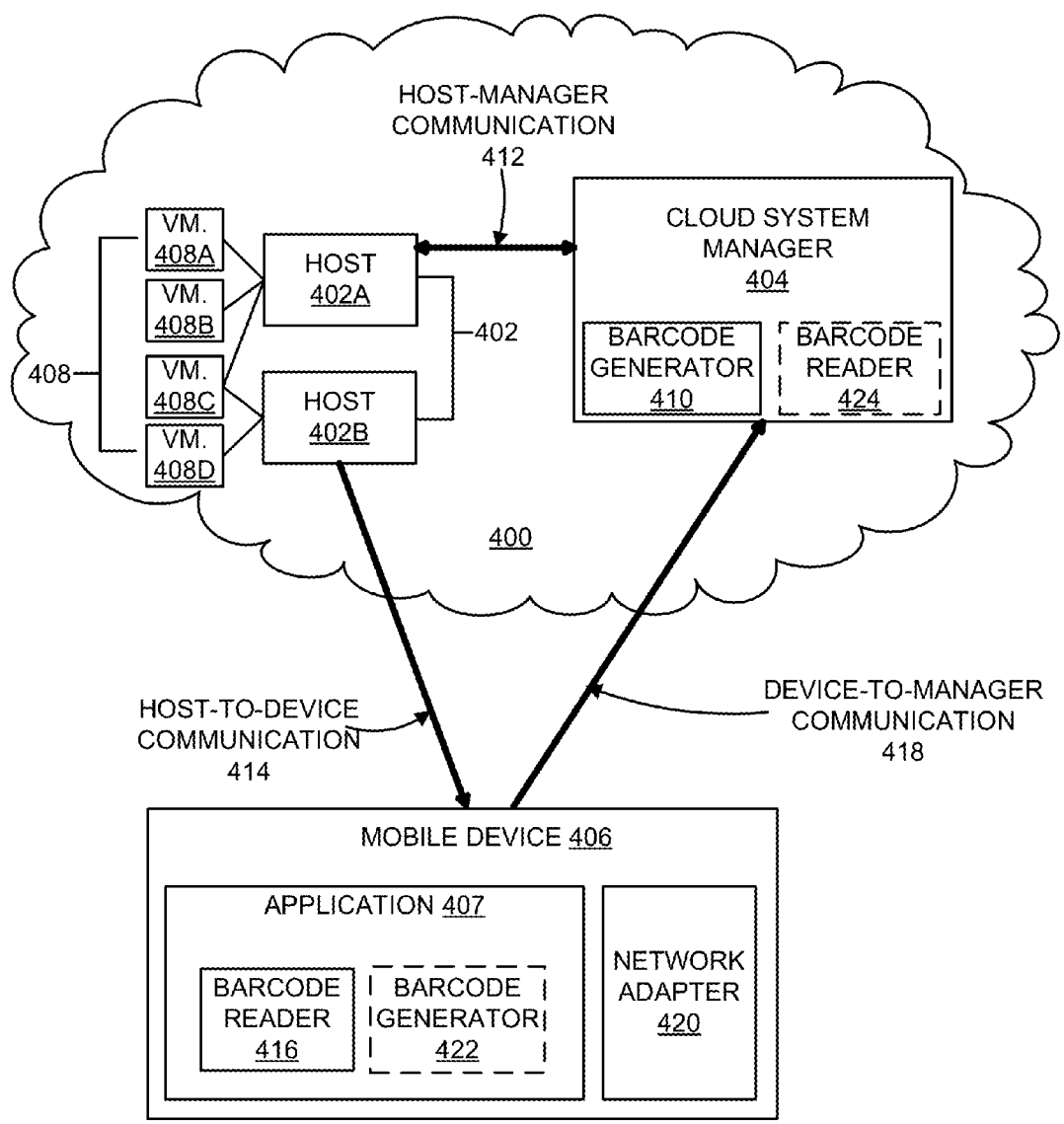
FIG. 4 illustrates a work flow diagram of a cloud computing environment that is configured to provide a three-way communication between hosts, cloud system manager, and mobile device, according to various embodiments.

FIG. 4 illustrates a work flow diagram of a cloud computing environment 400 that is configured to provide a three-way communication between hosts 402, cloud system manager 404, and mobile device 406, according to various embodiments. The three-way communication may be facilitated by a barcode. For example, the cloud system manager 404 can control the VMs 408 on the hosts 402 and generate a barcode for the hosts 402 (i.e., host manager communication 412). A mobile device 406 may read the barcode to obtain the configuration settings of the host 402 (i.e., host to device communication 414). The mobile device may make changes to the host 402 and communicate the changes to the cloud system manager 404 (device to manager communication 418).

One or more hosts 402 and a cloud system manager 404 may be operated within the cloud computing environment 400. Throughout this disclosure, the term host can be used interchangeably to refer to a cloud computing node that "hosts" one or more virtual machines 408. The hosts 402 provide hardware resources to a virtual machine 408.

The cloud system manager 404 can provide the management functions to allocate hardware resources from one or more hosts 402 to one or more virtual machines 408 via host manager communication 412. For example, VM 408a, VM 408b, and VM 408c may use hardware resources from host 402a while VM 408c and VM 408d may use hardware resources from host 402b. The hosting of VMs can be dynamic. For example, the host 402b may be constrained which causes the cloud system manager 404 to allocate resources from host 402a to VM408d. The cloud system manager 404 can be present on a host or a series of hosts. In various embodiments, the cloud system manager 404 can be hosted by a dedicated computer hardware.

A mobile device 406 may operate outside the cloud environment. The mobile device 406 may be utilized by a user such as a network administrator. The mobile device 406 can be configured to read configuration settings from the host 402 (i.e., host to device communication 414). The mobile device 406 may also have a network adapter 420 to communicate with the cloud system manager 404. The network adapter 420 may communicate over a wireless communication, e.g., Wi-Fi®, Bluetooth®, etc, with the cloud system manager 404.

The system manager 404 may receive communications from the mobile device 406 (i.e., device to manager communication 418). The communications can include changes to settings of a host. For example, if the user of the mobile device 406 increases the allocation of a virtual machine on the host, then the mobile device can communicate with the cloud system manager 404 via one or more cloud computing nodes (which may also be a host).

Information on one or more virtual machines 408 connected to a host 402, e.g., a specific configuration for a VM 408, may be identified from the host and communicated to the cloud system manager 404 via a host-manager communication 412. A barcode generator 410, which may be run inside the cloud system manager 404, may generate a scannable 2-dimensional barcode, e.g., Quick Response Code®, based on the information received from the host 402. The barcode may represent the information on the one or more VMs 408. The barcode may be encoded using a combination of standards. Encryption may also be employed to add security to the communications. Once the barcode is generated, the cloud system manager may communicate the barcode to the corresponding host 402 via the host-manager communication 414. The host 402 may be configured to display the barcode on a display.

The mobile device 406 may capture the barcode. The mobile device 406 may have an application 407 that includes a barcode reader 416. The barcode reader 416 is configured to capture the barcode through an optical device and decode the barcode. The barcode reader 416 may be operated within the mobile device to decode the barcode. Once the barcode is decoded, a user may be able to make changes to the information on the one or more VMs 408, e.g., a configuration of a particular VM, and send the changes to the cloud system manager 404 via a device-to-manager communication 418. The changes to the information may be communicated to the cloud system manager 404 in a variety of manners. For example, the device to manager communication 418 may include network communication through a network adapter 420 (e.g., wireless or wired), or visual communication. In various embodiments, the application 407 may have an optional barcode generator 422 to accomplish visual communication. The barcode generator 422 may generate a barcode based on the changes to the information from the mobile device 406. The barcode may communicate the changes to the cloud system manager 404 via a barcode reader 424 accessible to the cloud system manager 404. A possible advantage to visual communication may include the ability to avoid any man-in-the-middle attack that may physically intercept the communication between a user and a host.

Figure 5:
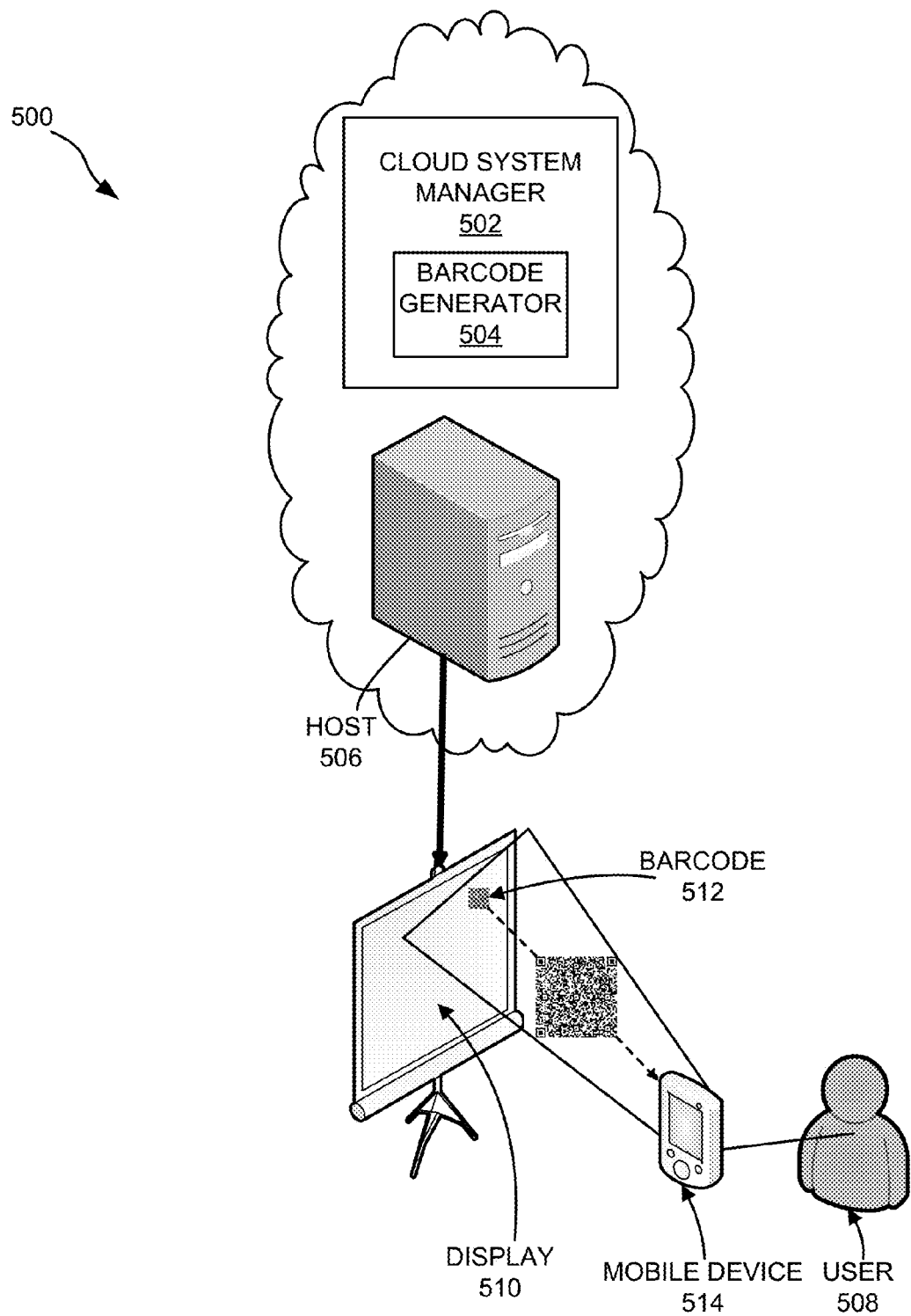
FIG. 5 illustrates a work flow diagram of a system of a physical machine, or a host, that displays a barcode scannable by a mobile device, according to various embodiments.

FIG. 5 illustrates a work flow diagram of a system 500 of a physical machine, or a host, that displays a barcode scannable by a mobile device, according to various embodiments. A cloud system manager 502 and a barcode generator 504 therein may be operated in a cloud computing environment. Elements of the system 500 can correspond to the system 400. For example, the cloud system manager 502 can correspond to the cloud system manager 404 in FIG. 4 and the barcode generator 504 can correspond to the barcode generator 410 in FIG. 4. A host 506, e.g. a physical server, may be physically accessible to a user 508. The host 506 can correspond to the hosts 408 in FIG. 4. A display 510 may be connected to the host 506 and display a barcode 512, and may also be physically accessible to the user 508. The user may utilize a mobile device 514 with the scanning capability to capture the barcode. Examples of the mobile device 514 may include, but are not limited to, a smart phone, personal digital assistant (PDA), tablet, laptop, etc.

In various embodiments, the cloud system manager 502 may allow the barcode generator 504 to generate a barcode 512 that represents the information of one or more virtual machines on the host 506. Once the barcode 512 is generated, the host 506 may display the barcode 512 on the display 510. The barcode 512 can be displayed on the screen 510 in a variety of techniques, e.g., difference sizes and/or different locations on the screen. The barcode 512 may be displayed in a manner such that a full view of the barcode 512 can be captured by the mobile device 514. Once the barcode 512 is displayed on the screen 510, the user 508 may use a mobile device 514 to scan the barcode 512 for further steps to read and decode the information contained therein.

Figure 6:
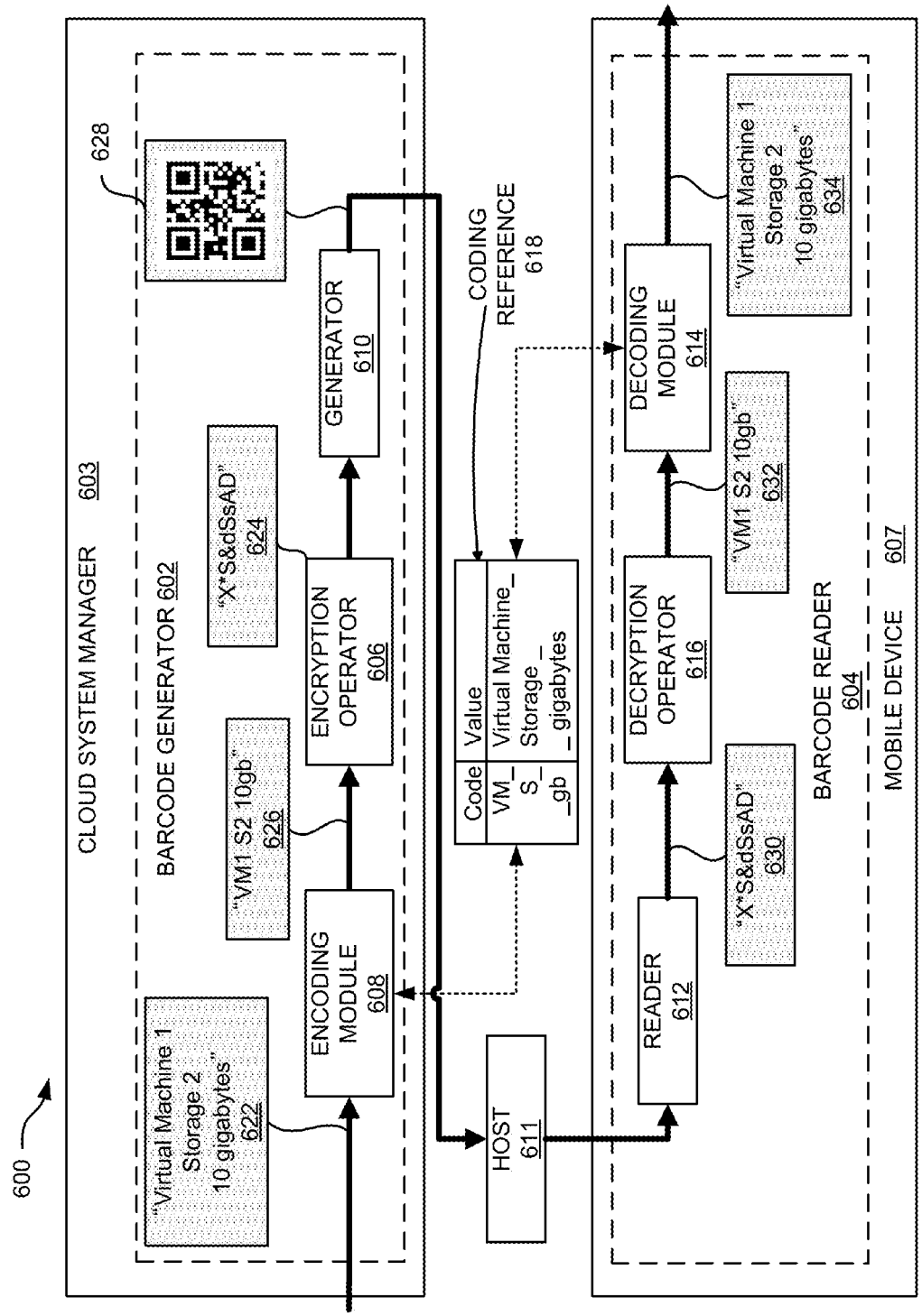
FIG. 6 illustrates a work flow diagram of a system that is configured to generate and decode a barcode, according to various embodiments.

FIG. 6 illustrates a work flow diagram of a system 600 that is configured to generate and decode a barcode, according to various embodiments. The system 600 can include components of the system 400 in FIG. 4. For example, a barcode generator 602 can correspond to the barcode generator 410 in FIG. 4 and the barcode reader 604 can correspond to the barcode reader 416 in FIG. 4. The system 600 may rely on a combination of coding and encryption to provide security. For example, the host may generate an encrypted barcode describing certain parameters on the host. The encrypted barcode may be used by a service technician to identify a particular VM hosted by the host. A third party that is able to read the barcode will not be able to decipher the settings without either the encryption settings or a coding reference. The system 600 includes a cloud system manager 603, a host 611, and a mobile device 607.

The cloud system manager 603 may have a barcode generator 602. The barcode generator 602 may have an encryption operator 606, an encoding module 608, and a generator 610. The encoding module 608 may receive information regarding the parameters of a host (i.e., incoming data 622). The incoming data 622 may contain one or more parameters for one or more VMs. The data 622 of the one or parameters have been converted into a standardized encoding format (discussed herein). Data 622 may contain data for the first virtual machine, second storage volume and set the size of the second storage volume at 10 gigabytes. Data 622 is provided for illustrative purposes. The data 622 can be encoded via the encoding module 608. The encoding module 608 can refer to a coding reference 618. The coding reference 618 may be a table of codes for specific values. The coding reference 618 can refer to a specific sequence of letters and numbers to indicate the properties of the parameters. For example, the result (i.e., data 626) of the encoding module 608 to the incoming data 622 is "VM1 S2 10gb".

The encryption operator 608 can provide an additional layer of security by encrypting the data 626. Various asymmetric or symmetric encryption protocols may be used when encrypting the data 626. In one configuration, the encryption operator 606 can use a pseudo-random generated key to produce a string of characters (i.e., data 624). The encrypted data 624 may be further provided to a barcode generator 610. The generator 610 may generate an n-dimensional barcode 628 where n is at least 1, 2, or 3. The barcode may be a standardized, two-dimensional barcode such as QR Code®, as illustrated in data 628. The barcode 628 can be displayed by a host 611.

The system 600 may also have a mobile device 607 to read the barcode from the host 611. The mobile device 607 can have a barcode reader 604. The barcode reader 604 may be operated on a mobile device and have a reader 612, a decryption operator 616, and a decoding module 614. The reader 612 may be configured to scan the barcode 628 and obtain, for example, an alphanumeric sequence 630. The reader 612 may be a mobile device application and utilize an optical scanning tool. The barcode reader 612 may decode data 630 from the barcode 628. In the example, the data 630 represents an encrypted version of the coded data (e.g., data 626). In various embodiments, the data 630 may be decrypted at the decryption operator 616 using a variety of decryption mechanisms that correspond to the encryption mechanisms used in the encryption operator 606. For example, the system 600 may use a public and private key to encrypt and decrypt data. The decryption operator 616 may produce decrypted data 632. The decrypted data 632 may correspond to data 626.

The decrypted data 632 may be read by the decoding module 614. The decoding module 614 may be configured to receive data 632 and reference the coding reference 618 to obtain data 634. The data 634 may effectively capture the same one or more parameters for the VM (e.g., data 622) that entered the barcode generator 602.

Figure 7:
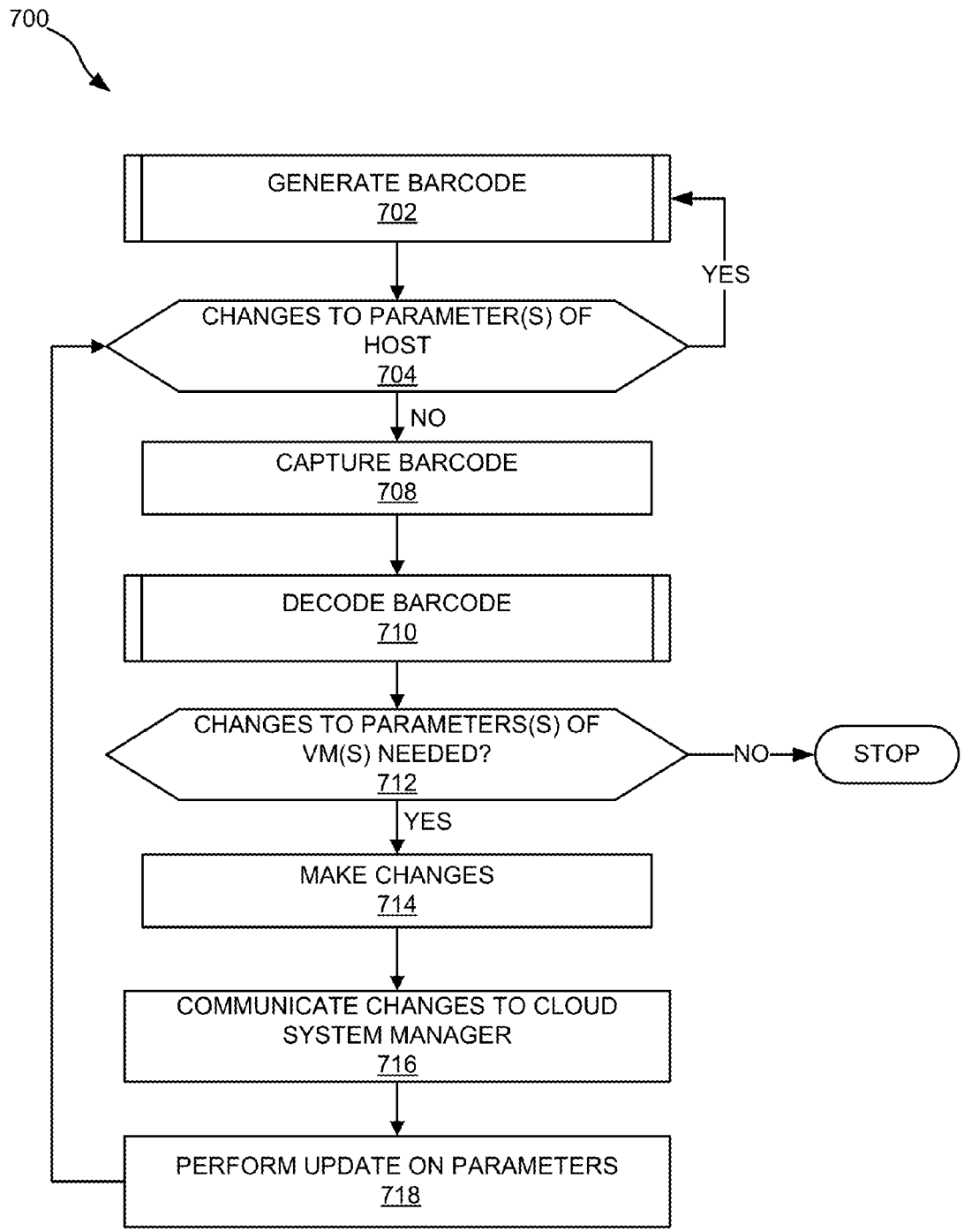
FIG. 7 illustrates a flowchart of a method for managing cloud resources using a dynamically generated barcode, according to various embodiments.

FIG. 7 illustrates a flowchart of a method 700 for managing cloud resources using a dynamically generated barcode, according to various embodiments. The method 700 may involve generating a barcode from parameter data, capturing a barcode with a mobile device, decoding the barcode, and updating the cloud system manager with changed parameter data. The method 700 may begin at operation 702.

At operation 702, the cloud system manager may generate a barcode that may represent one or more parameters for a VM of a host. The cloud system manager may receive the various parameters from the host. The parameters may be encoded according to a proprietary format in accordance with the cloud environment coding reference. The encoded parameters may be further encrypted and a barcode generated. In various embodiments, the cloud system manager may utilize a variety of encoding techniques described herein.

At operation 704, the cloud system manager can monitor the parameters that are encoded into a barcode for changes. For example, the cloud system manager may generate a barcode in a dynamic manner so that the host may immediately display a new barcode in response to detecting any changes to the cloud component/host. For example, a user may change a configuration of a VM or a VM component, and the change may alert a cloud system manager to create a new barcode which can properly represent the newly updated VM or VM component. At operation 704, the cloud system manager may determine whether there have been any changes to one or more parameters of any VM within a host. An example of determining any changes to the parameters may include the detection of a request received from a mobile device for updates on the cloud resources, e.g., hosts, memory, and storage. If the cloud system manager determines an existence of at least one change to the parameter, then the method 700 may continue to operation 702 to generate a barcode based on the change. If there is no indication of any changes to the parameter associated with a barcode, then the method 700 may continue to operation 708.

At operation 708, the dynamically generated barcode may be captured on a mobile device. An example of capturing the barcode is illustrated further herein. The mobile device may have an optical scanner (e.g., camera or a photo capturing functionality) and an application that can read a standardized barcode, e.g., a UPC code. The application can correspond to the barcode reader 416 in FIG. 4. After reading the barcode, the application may output information contained in the barcode.

At operation 710, an application having a barcode reader may decode the barcode on a mobile device. The application may also provide a graphical user interface that may allow a user to interact through visuals such as icons. The application may allow the user to navigate through VMs of a host and components of a particular VM. The application may also have a feature that may allow the user to edit one or more parameters for one or a more VMs.

At operation 712, the application may determine whether at least one change to the parameters of a VM is required. In various embodiments, the application can use user input to affect the determination. For example, the application can receive input from the user to change a storage aspect of a VM or modify which VM is hosted on a particular host. If the user does not want makes changes, then the method 700 may stop. The changes can also occur automatically. For example, if the application is configured to automatically request to stop hosting a VM that uses a certain amount of storage capacity of the host, then the method 700 can continue to operation 714.

At operation 714, the application may allow the user to modify the desired parameter of a VM. Once the user completes the modification of one or more parameters, the application may, at operation 716, communicate the changes to the cloud system manager. The communication can be in the form of a request to the cloud system manager, according to various embodiments. The request may also be may be sent via a network communication. In various embodiments, the request may be encrypted and/or encoded into a barcode to further raise the security level of the method. For example, aspects of the method 700 may be repeated on the mobile device in regards to the modified parameters of a VM as described herein.

At operation 718, the cloud system manager may perform an update on the host or corresponding VMs according to the changes received by the cloud system manager. For example, the cloud system manager may determine whether the request is made in a proper manner (e.g., with a priority or in the proper format). If the cloud system manager determines that the request is made improperly, then the cloud system manager may not process the request and may also communicate an error message to the mobile device. For example, if a user has made a request to modify a configuration of VM that does not exist within the host, the cloud system manager may send an alert to the mobile device providing an error message and/or error code number.

In various embodiments, the cloud system manager may implement an access restriction. Once the cloud system manager receives a request from a mobile device, the cloud system manager may determine the user access permission of the request. The cloud system manager may determine whether the user access permission of the request meets the access permission of the user to the host or the one or more VMs. If the cloud system manager determines that a request has been made from a mobile device whose user's access permission does not meet the access permission of the cloud environment, then the cloud system manager may not process the request. The cloud system manager may also send an error message informing the error is due to improper access permission.

Figure 8:
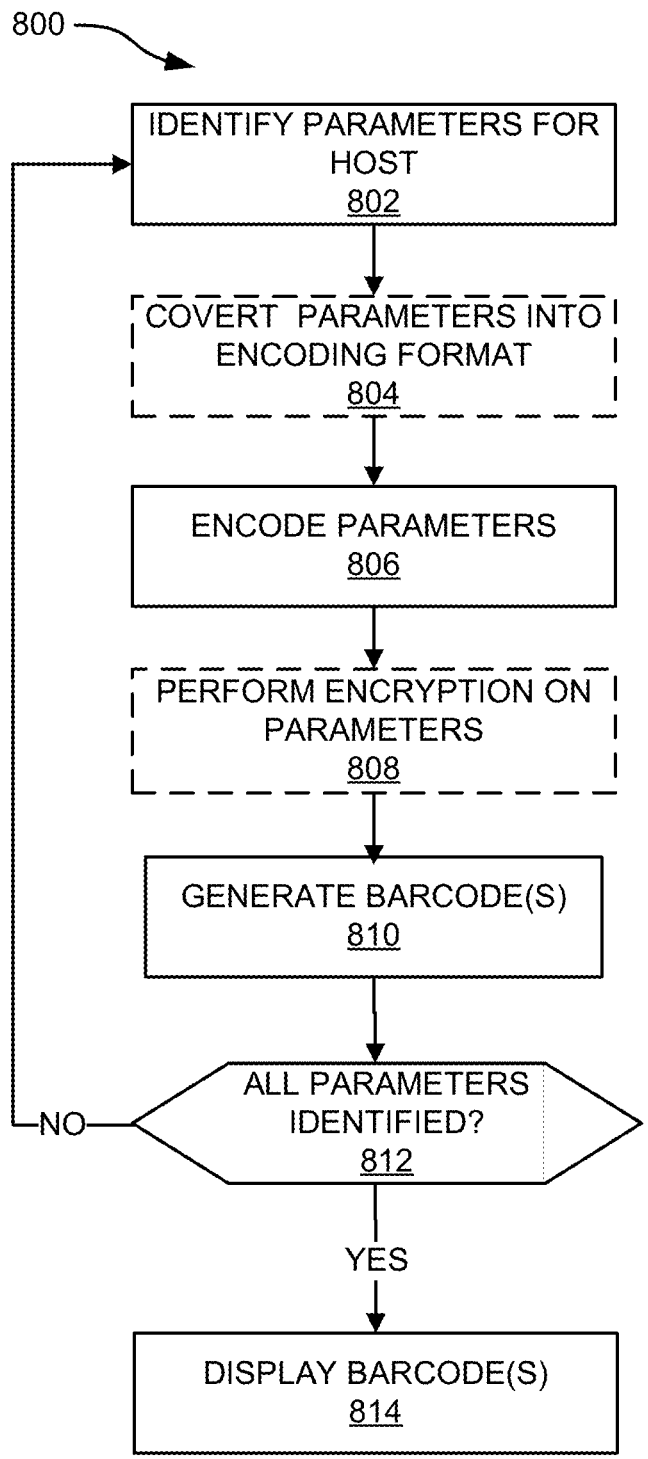
FIG. 8 illustrates a flowchart of a method that generates a barcode representing one or more parameters for one or more VMs within a host, according to various embodiments.

FIG. 8 illustrates a flowchart of a method 800 that generates a barcode representing one or more parameters for one or more VMs within a host, according to various embodiments. The method 800 can include identifying various parameters for a virtual machine and converting the various parameters into a barcode. In various embodiments, the barcode can include a configuration of a plurality of virtual machines on the host. For example, the parameters of the host can include the individual virtual machine configurations. The method 800 may correspond to operation 702 from FIG. 2. The method 800 may begin at operation 802.

At operation 802, the cloud system manager may identify one or more parameters for a host. The cloud system manager may also identify one or more parameters for components of the VM. Examples of parameters VMs may include information regarding: memory, storage capacity, processor, internet protocol (IP) address, and a graphical user interface (GUI) preference.

At operation 804, the cloud system manager may convert the identified parameters into a standardized encoding format. The standardized encoding format may describe the particular format necessary to encode a barcode from a parameter. For example, the barcode encoding may not provide for recognition of special characters or non-integer characters. Examples of standardized encoding formats may include, but are not limited to, numeric, alphanumeric, binary, and kanji. Once the parameters are converted into an encoding format, then the parameters may be encoded in operation 806.

In operation 806, the cloud system manager may encode the parameters using a coding reference. The coding reference may be a reference that relates a shortened notation of the parameters to the parameter. In various embodiments, the coding reference may be a table. For example, the coding reference can relate "storage capacity of VM C=10 GB" to "VCS 10G." The coding reference may also be used in decoding the barcode on a mobile device. In various embodiments, the coding reference used in the encoding may be different than the coding reference used in the decoding. The mismatch may prove advantageous for security purposes. For example, a "C" may correspond to storage when encoded but is translated to "S" when decoded. Thus, when a third-party without the coding reference intercepts the C, the third-party would not know what the "C" corresponds to. An example of the coding reference may be a list of codes and their corresponding value. The implementation of the coding reference may be further described herein. Once the parameters are encoded, then the method 800 may continue to operation 808.

At operation 808, the encoded parameters may be encrypted according to various encryption schemes, e.g., symmetric, or asymmetric encryption. The encryption scheme may be performed before the encoding operation, according to various embodiments. In various embodiments, operation 808 may be considered optional depending on the level of security required.

At operation 810, the cloud system manager may generate a barcode using a standardized barcode mechanism. The barcode may be one dimensional, two dimensional or three dimensional. Types of standardized barcodes may include, but are not limited to, QR Code®, UPC, and MaxiCode®. A standardized barcode may be generated based on the encoded parameters. Each barcode may represent a listing of VMs that are hosted by the host. The size of the barcode may be a limiting factor to how much information a single barcode can contain. In various embodiments, a sub-barcode may be generated for each VM that describes each VM configuration more thoroughly. For example, the sub-barcode representing one or more parameters for a VM of a host may be aligned with other sub-barcodes representing one or more parameters for other VMs of the same host to create a barcode that collectively represents the host.

At operation 812, the cloud system manager may determine whether all parameters of the host have been identified. Operation 812 may also occur after operation 802, according to various embodiments. For example, once the parameters for a VM are identified, then the cloud system manager may allow the method 800 to continue to operation 814. In various embodiments, the parameters of the host may include VMs. The parameters of the host may also specify a detailed granularity such as the parameters of the VMs.

At operation 814, the cloud system manager may direct the host to display the barcode or barcodes for a user. The resulting barcode may, as a whole, represent parameters of all VMs in a host and the relationship between the VMs.

Figure 9:
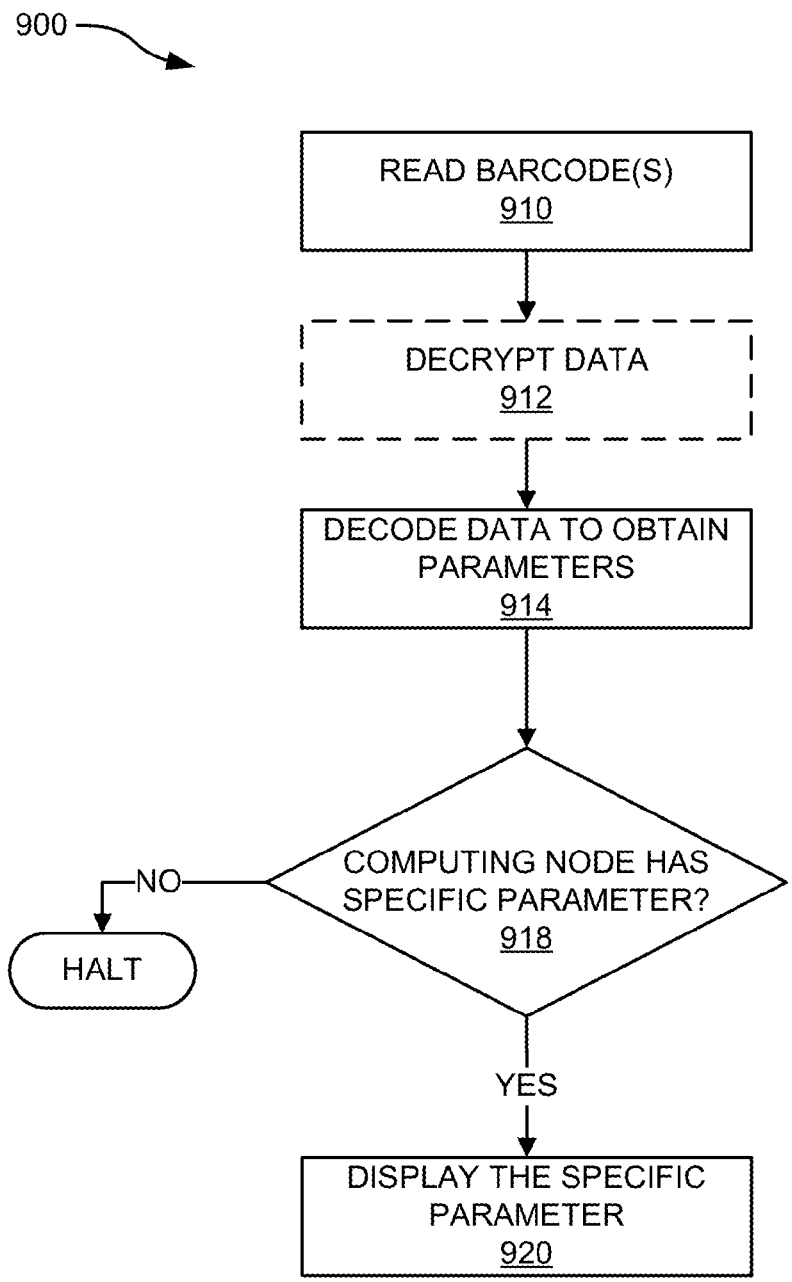
FIG. 9 illustrates a flowchart of a method for verifying a parameter on a computing node, according to various embodiments.

FIG. 9 illustrates a flowchart of a method 900 for verifying a parameter on a computing node, according to various embodiments. The method 900 can include actions taken by an application on a mobile device. The application may have a barcode scanner with access to an optical scanner to read the barcode and be configured to process the data from the barcode. The method 900 may begin at operation 910.

At operation 910, the application may read a barcode using an optical scanner. The optical scanner may include a camera or a dedicated barcode reader. The application can derive a string of data from the barcode which may be undecipherable. In various embodiments, the application can access a dynamically generated barcode from the computing node. Thus, the barcode can change depending on the settings of the computing node. The accessing can include reading (as in operation 910) but may also include scanning, receiving, or the like.

In operations 912-914, the application can identify one or more parameters of the computing node from the first dynamically generated barcode. At operation 912, the application may decrypt the data read from the barcode if the data is encrypted. In various embodiments, operation 912 may be considered optional. At operation 914, the application may decode the decrypted data using the coding reference. The coding reference can be used to reconstruct the one or more parameters of the computing node and obtain usable data from the coding. For example, S_00110 may refer to storage capacity in gigabytes.

At operation 918, the application can determine whether the computing node has a specific parameter from the one or more parameters. For example, if a user of the application is searching for a storage value for a particular virtual machine on the computing node, but the particular virtual machine does not have any storage assigned, then the application may return a not found entry. If the computing node has a specific parameter, then the method 900 can continue to operation 920.

At operation 920, the application can display the specific parameter on the mobile device. The user of the mobile device can take a variety of actions, e.g., modifying the parameter, migrating virtual machines, or shutting down the compute node for maintenance.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for verifying a parameter on a computing node, comprising:
   accessing, by a mobile device, a dynamically generated encoded visual representation from a computing node;
   identifying, by the mobile device, one or more parameters of the computing node from the dynamically generated encoded visual representation;
   determining whether the computing node has a first parameter from the one or more parameters;
   displaying the first parameter in response to the computing node having the first parameter;
   creating a modified parameter from the first parameter;
   providing the modified parameter to a cloud system manager;
   accessing a user access permission;
   determining a first parameter access permission;
   determining whether the user access permission meets the parameter access permission; and
   updating the first parameter with the modified parameter in response to the user access permission meeting the first parameter access permission.

2. The method of claim 1, wherein the computing node is a cloud computing node operating in a cloud computing environment, and the one or more parameters concerns one or more virtual machines within the cloud computing node.

3. The method of claim 1, wherein providing the modified parameter to the cloud system manager includes:
   providing the modified parameter to the cloud system manager via a wireless network.

4. The method of claim 1, wherein the modified parameter is similar to the first parameter.

5. The method of claim 1, further comprising:
   generating a second dynamically generated encoded visual representation based on the modified parameter.

6. The method of claim 1, wherein identifying one or more parameters includes:
   decoding the dynamically generated encoded visual representation into the one or more parameters based on a coding reference; and
   reconstructing the one or more parameters of the computing node.

7. The method of claim 6, further comprising:
   determining the dynamically generated encoded visual representation is encrypted; and
   decrypting the dynamically generated encoded visual representation.

8. The method of claim 1, wherein the one or more parameters relate to: a memory, a storage capacity, a processor, an internet protocol (IP) address, and a graphical user interface preference for a virtual machine supported by the computing node.

9. The method of claim 1, wherein the encoded visual representation is a barcode.

* * * * *